US006481448B2

(12) United States Patent
Mathieu

(10) Patent No.: US 6,481,448 B2
(45) Date of Patent: Nov. 19, 2002

(54) WASHING AND RECYCLING UNIT FOR ON-SITE WASHING OF HEAVY MACHINERY

(76) Inventor: Christian Mathieu, 1296 rue Camille Frigon, Normandin, Quèbec (CA), G8M 4A2

( * ) Notice: Subject to any disclaimer, the term of this patent is extended or adjusted under 35 U.S.C. 154(b) by 0 days.

(21) Appl. No.: 09/899,719

(22) Filed: Jul. 5, 2001

(65) Prior Publication Data

US 2002/0002985 A1 Jan. 10, 2002

(51) Int. Cl.$^7$ ............................ B08B 3/00; B01D 21/26

(52) U.S. Cl. ........................ 134/109; 134/123; 134/172; 134/182; 210/167; 210/194; 210/295; 210/360.1

(58) Field of Search .......................... 134/10, 107, 109, 134/123, 172, 182; 210/153, 167, 194, 241, 295, 323.1, 360.1

(56) References Cited

U.S. PATENT DOCUMENTS

| | | | | | |
|---|---|---|---|---|---|
| 2,852,306 | A | | 9/1958 | Skipp | 299/41 |
| 3,378,018 | A | * | 4/1968 | Lawter | 134/109 |
| 3,774,625 | A | * | 11/1973 | Wiltrout | 134/104.2 |
| 5,028,017 | A | | 7/1991 | Simmons et al. | 244/134 |
| 5,354,014 | A | * | 10/1994 | Anderson | 134/123 |
| 5,423,339 | A | | 6/1995 | Latimer | 134/104.2 |
| 5,458,299 | A | * | 10/1995 | Collins et al. | 134/123 |
| 5,498,329 | A | * | 3/1996 | Lamminen et al. | 134/123 |
| 5,556,535 | A | * | 9/1996 | Van Der Est | 138/40 |
| 5,560,782 | A | | 10/1996 | Latimer | 134/10 |
| 5,669,982 | A | | 9/1997 | Latimer | 134/10 |

FOREIGN PATENT DOCUMENTS

| | | | | |
|---|---|---|---|---|
| DE | 1013190 | | 8/1957 | |
| DE | 1242115 | | 6/1967 | |
| DE | 29701865 U1 | * | 5/1997 | |
| DE | 19806400 | | 8/1999 | B08B/3/00 |
| JP | 58126238 | | 7/1983 | B60S/3/04 |

* cited by examiner

*Primary Examiner*—Alexander Markoff
*Assistant Examiner*—Joseph Perrin
(74) *Attorney, Agent, or Firm*—Darby & Darby

(57) ABSTRACT

A washing and recycling unit for on-site washing of heavy machinery. The unit has a supporting frame onto which is mounted a washing liquid storage tank. A washing hose arrangement connected to the tank injects washing liquid over the heavy machinery. A drainage receptacle positioned under the heavy machinery collects used liquid mixture falling from the heavy machinery. The used liquid mixture is sucked up with a suction hose connected to a cyclone which separates rough solids from liquids. A pump and filtering arrangement recycles liquid from a settling tank under the cyclone by pumping it out, filtering it and transferring it into the washing liquid storage tank. A hoisting system mounted onto the supporting frame is used to movably support an operator directing the washing liquid around the heavy machinery.

18 Claims, 9 Drawing Sheets

WASHING AND RECYCLING UNIT FOR ON-SITE WASHING OF HEAVY MACHINERY

FIELD OF THE INVENTION

The present invention relates to a washing and recycling unit and a method for on-site washing of heavy machinery. The unit may be mobile or fixed at the site and is particularly useful for washing forestry equipment, such as tractors.

BACKGROUND OF THE INVENTION

Forestry vehicles and machinery usually become very dirty with mud, motor oil, hydraulic oil, grease and/or other flammable contaminants. If these are not properly washed on a regular basis, there is a risk that the contaminants may suddenly ignite, leading to the destruction of these expensive equipment or even causing devastating forest fires. For that reason, insurance companies particularly require that forest vehicles be washed regularly to reduce the risks associated with this kind of fire hazard.

The traditional method of washing forestry equipment consists of using a hose connected to a pump that is supplied by a fire hydrant, a pressurized washer or a nearby stream or river.

One of the major disadvantages of the traditional method resides in the contamination of the environment as the dirty wash water spills on the ground and infiltrates into rivers and lakes. Furthermore, the traditional method uses of large amounts of water, typically around 300 to 350 liters.

Another method of washing forestry vehicles is to wait for a time period where the machine is not in use and take it to a garage where it is washed with pressurized jet stream of water. However, such a method uses enormous amounts of fresh water, typically around 9000 liters. Furthermore, there is no recycling of the used water and contaminants washed off the forestry vehicles eventually end up in sewer systems. Also, as this washing of the machine cannot be done regularly on the forest site, this increases the chances of fire hazard and of polluting the environment.

Commercial car and truck washing has become a focus of public concern and government regulation recently over the disposal of used wash water into municipal sewer systems or directly into the ground. The combination of oil, water, soap, dirt and other chemicals in the used wash water can be harmful to the environment if allowed to drain into a sewer or seep into the earth.

Known in the art are U.S. Pat. Nos. 5,669,982 and 5,560,782 (LATIMER), which show mobile washers for washing cars, trucks and other types of machinery on site. These washers are equipped with water treatment systems. Typically the trucks are self-sufficient in that they contain all the equipment needed for the cleaning purposes, for instance, water reservoir, soap injector, sprayers, hoses, a nacelle or carriage and a drainage receptacle. During the washing, the used water is drained onto the drainage receptacle and forwarded back inside the washer in order to be recycled. U.S. Pat. No. 5,423,339 (LATIMER) shows an apparatus for treating articles with wash water. A wash pad made of three unconnected portions (one center portion and two side portions) is used.

The water treatment systems taught by LATIMER are however not adapted to clean grease and hydrocarbon contaminants; they are intended to remove sand or salt particles. The efficiency of the recycling process is therefore limited, and more clean water is required, which may be inconvenient in remote places where no or little water is available. Furthermore, no pads are provided for covering the wheels of the vehicle. Hence, the polluted water falling on the wheels directly seeps in the ground, which is damageable for the environment.

One of the problems encountered in washing forestry or heavy vehicles is the danger that is posed to an operator who directs his washing hose toward the vehicle as he or she climbs thereon with the possible consequence of falling, causing grave injuries or even death.

SUMMARY OF THE INVENTION

It is an object of the present invention to provide a water recycling unit that is designed to maximize the recycling of the water used for washing machinery and to minimize water losses.

It is also an object of the present invention to provide a water recycling unit which is safer to operate when the operator climbs onto the machinery to be washed.

It is also an object of the present invention to provide a water recycling unit which highly decontaminates the used liquid falling off dirty machinery.

According to the present invention, there is provided a washing and recycling unit for on-site washing of heavy machinery, comprising:

- a supporting frame;
- a washing liquid storage tank mounted onto the supporting frame for storage of washing liquid;
- a washing hose arrangement connected to the tank, for injecting the washing liquid over the heavy machinery;
- a drainage receptacle adapted to extend under the heavy machinery, for collecting used liquid mixture falling from the heavy machinery derived from the washing liquid being injected thereover;
- a suction hose arrangement for sucking up the used liquid mixture from the drainage receptacle;
- a cyclone mounted onto the supporting frame and connected to the suction hose arrangement for receiving the used liquid mixture and separating rough solids from liquids contained in the used liquid mixture;
- a settling tank mounted onto the supporting frame and under the cyclone;
- a pump and filtering arrangement mounted onto the supporting frame and extending between the settling tank and the washing liquid storage tank for pumping out and filtering liquid from the settling tank and transferring the liquid into the washing liquid storage tank; and
- a hoisting means mounted onto the supporting frame, for movably supporting an operator directing the washing liquid around the heavy machinery.

According to the present invention, there is also provided a method of on-site washing of heavy machinery, comprising steps of:

- placing a drainage receptacle under the heavy machinery for collecting used liquid mixture falling from the heavy machinery;
- injecting washing liquid over the heavy machinery using a washing hose arrangement connected to a washing liquid storage tank;
- sucking up the used liquid mixture from the drainage receptacle using a suction hose arrangement connected to a cyclone separating rough solids from liquids contained in the used liquid mixture, the cyclone extending over a settling tank; and pumping out and filtering liquid from the settling tank and transferring the liquid into the washing liquid storage tank.

BRIEF DESCRIPTION OF THE DRAWINGS

The invention as well as its numerous advantages will be better understood by the following non-restrictive description of preferred embodiments made in reference to the appending drawings in which.

DETAILED DESCRIPTION OF THE INVENTION

Figure 2:
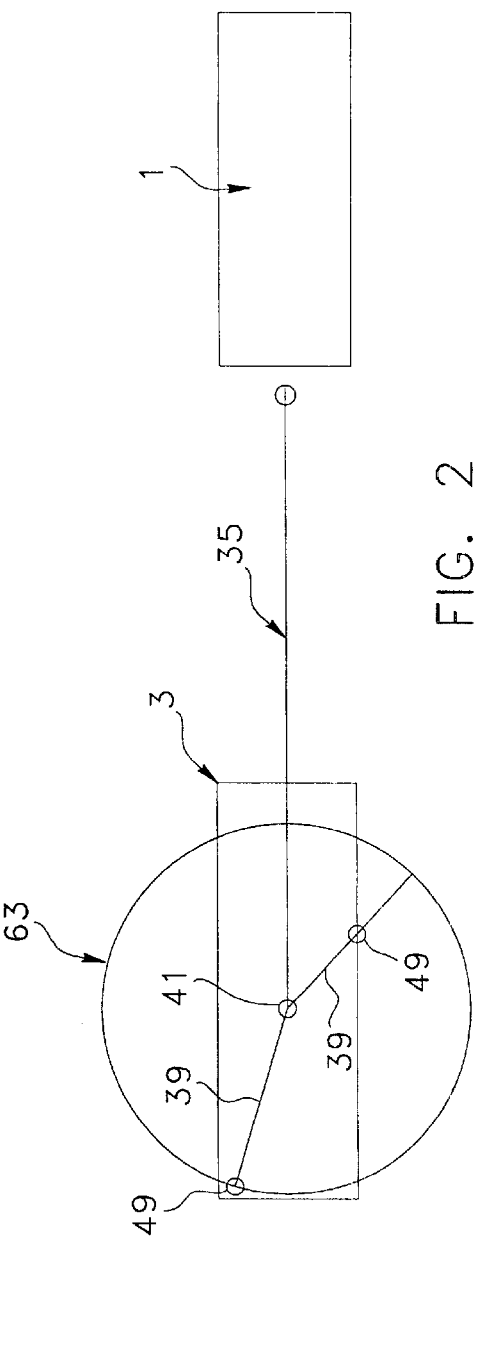
FIG. 2 is a top schematic view of the washing and recycling vehicle and the washing range provided by pivoting rails supported by the crane shown in FIG. 1.
Figure 1:
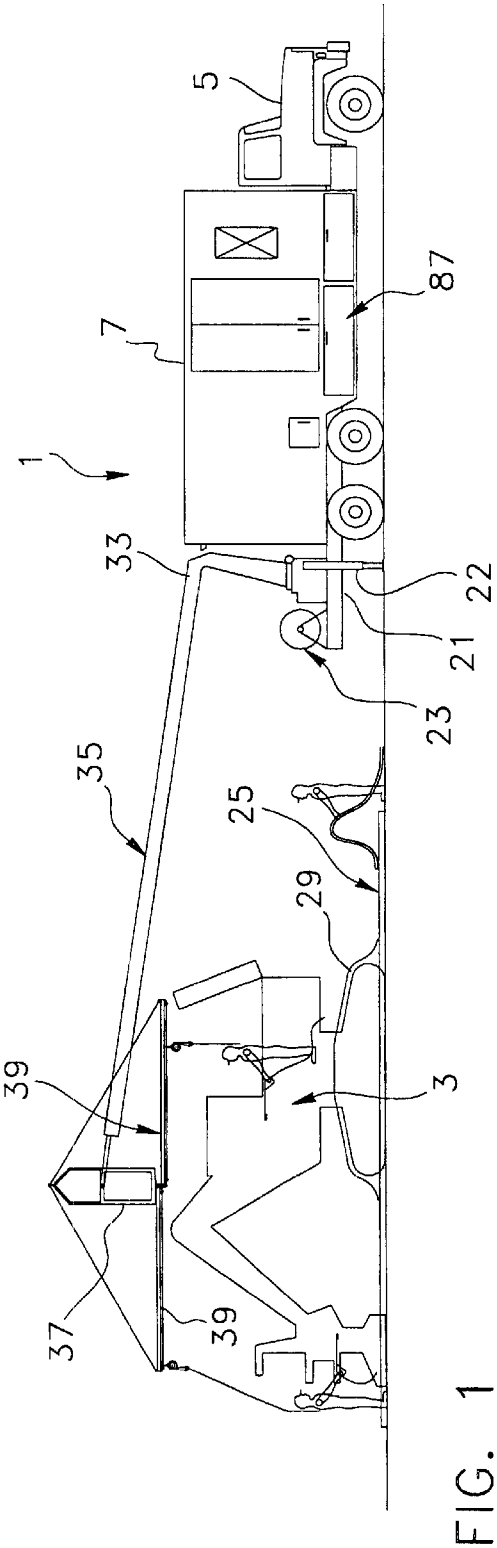
FIG. 1 is a side view of a washing and recycling vehicle with a crane supporting operators holding water pistols for on-site washing of a tractor according to a preferred embodiment of the present invention.

Referring to FIGS. 1 and 2, there is shown a washing and recycling unit 1 for on-site washing of heavy machinery according to a preferred embodiment of the present invention. As illustrated in FIG. 1, the heavy machinery may be a tractor vehicle 3 with a felling head, but those skilled in the art will understand that articles other than forestry equipment may be washed using the washing and recycling unit 1 of the present invention. In particular, heavy machinery can include industrial or railroad machines, transportation vehicles, mining equipment, etc.

The washing and recycling unit 1 can be placed on a truck 5, thus facilitating its transportation in and around forest sites. The truck 5 may be provided with a closed container 7 mounted on a supporting frame 21, wherein some of the washing equipment is housed. The truck may also be provided with retractable stabilizing legs 22.

The truck 5 may be further provided with a reel 23 where a flexible drainage receptacle is wound. A preferred drainage receptacle 25 used with the present invention is illustrated in FIG. 11.

Figure 11:
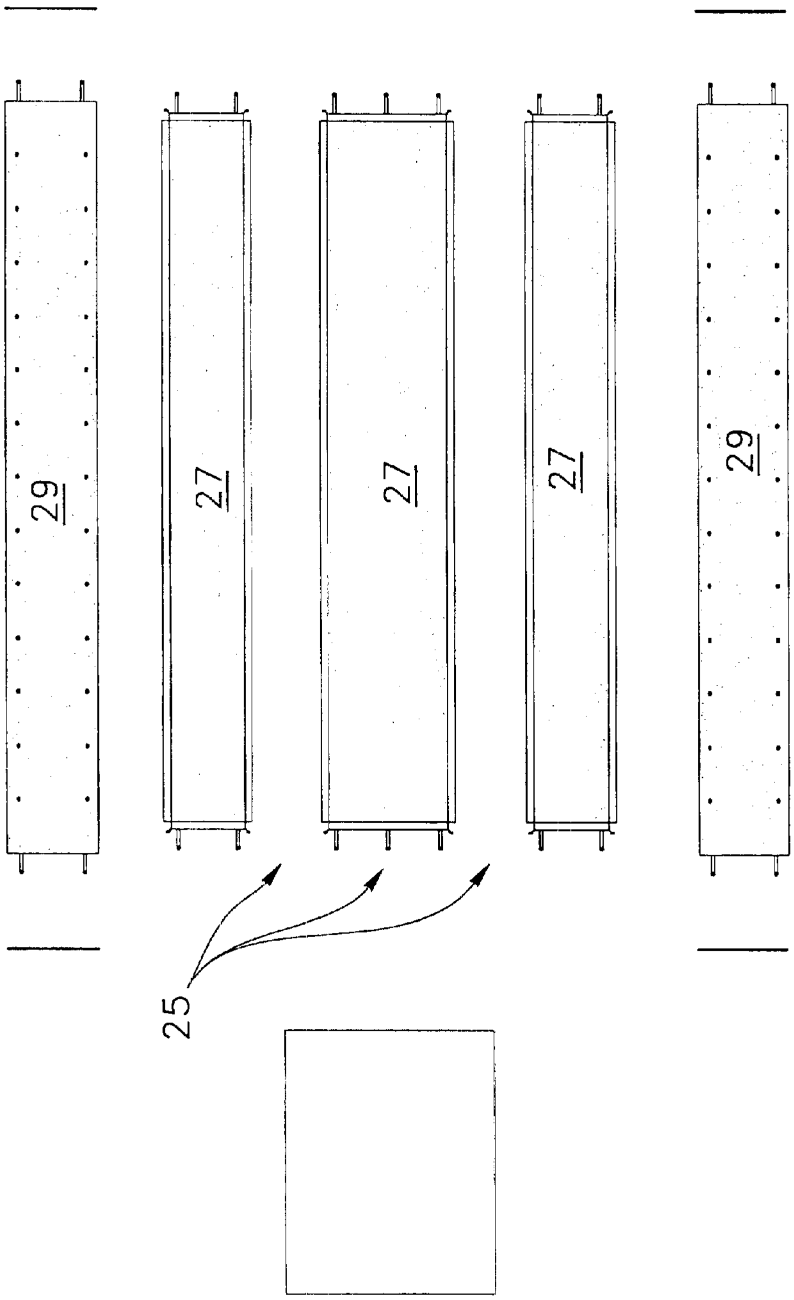
FIG. 11 is a top view of a drainage receptacle according to a preferred embodiment of the present invention.

Referring to FIG. 11, the preferred drainage receptacle 25 of the present invention is made of three individual ground strips 27 that are elongated and generally rectangular in shape. The ground strips 27 are made of impermeable material that allows collecting the used water for recycling purposes. Each of the strips 27 has peripheral flanges which may be inflatable. Two individual generally rectangular cover strips 29 are preferably further provided, for installation over each pair of side wheels respectively of the vehicle to be washed, thereby allowing water falling over the cover strips 29 to be directed onto the ground strips 27. Preferably, the ground strips 27 and the cover strips 29 are made of a resilient and flexible material, which may be vinyl.

Figures 12, 13:
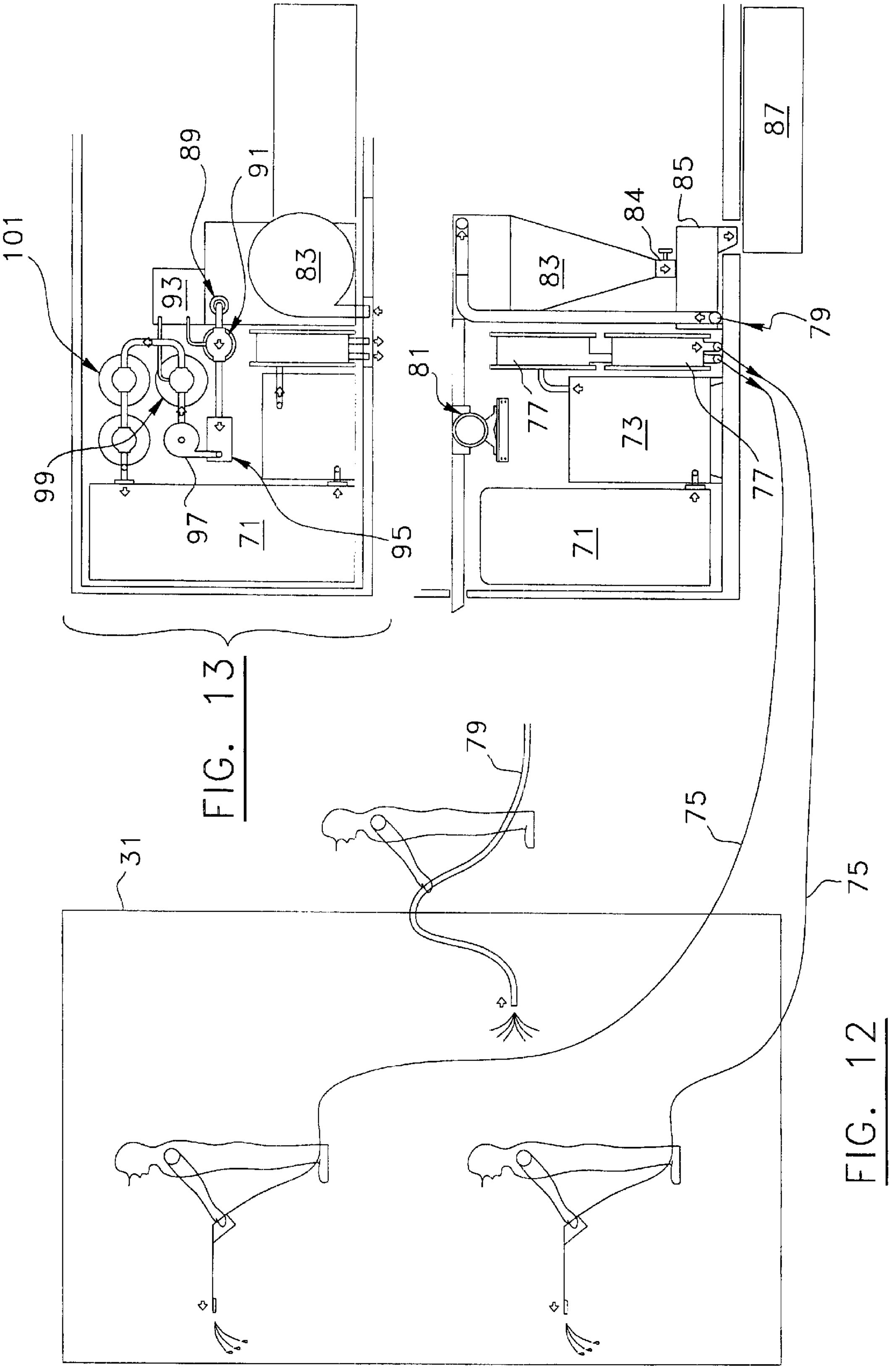
FIGS. 12 and 13 are, respectively, schematic side and top views showing liquid flow through main elements of the washing and recycling unit according to a preferred embodiment of the present invention.

As illustrated in FIG. 12, a more simpler drainage receptacle 31 may be used as well. Such type of draining receptacle is described in U.S. Pat. No. 5,423,339 (LATIMER).

Referring to FIGS. 1 to 7, the truck 5 is further provided with a hoisting system mounted onto the supporting frame 21 of the truck 5, for movably supporting an operator over and around the heavy machinery to be washed. The hoisting system may consist of a retractable crane 33 with a telescopic boom 35 at the end of which an operator is suspended for washing the machinery. The end of the boom 35 may further support a basket 37 designed to carry an operator. The hoisting system may be provided with pivoting rails 39 that can be either connected to the bottom of the basket 37 as shown in the figures or directly connected to the boom 35.

Figure 6:
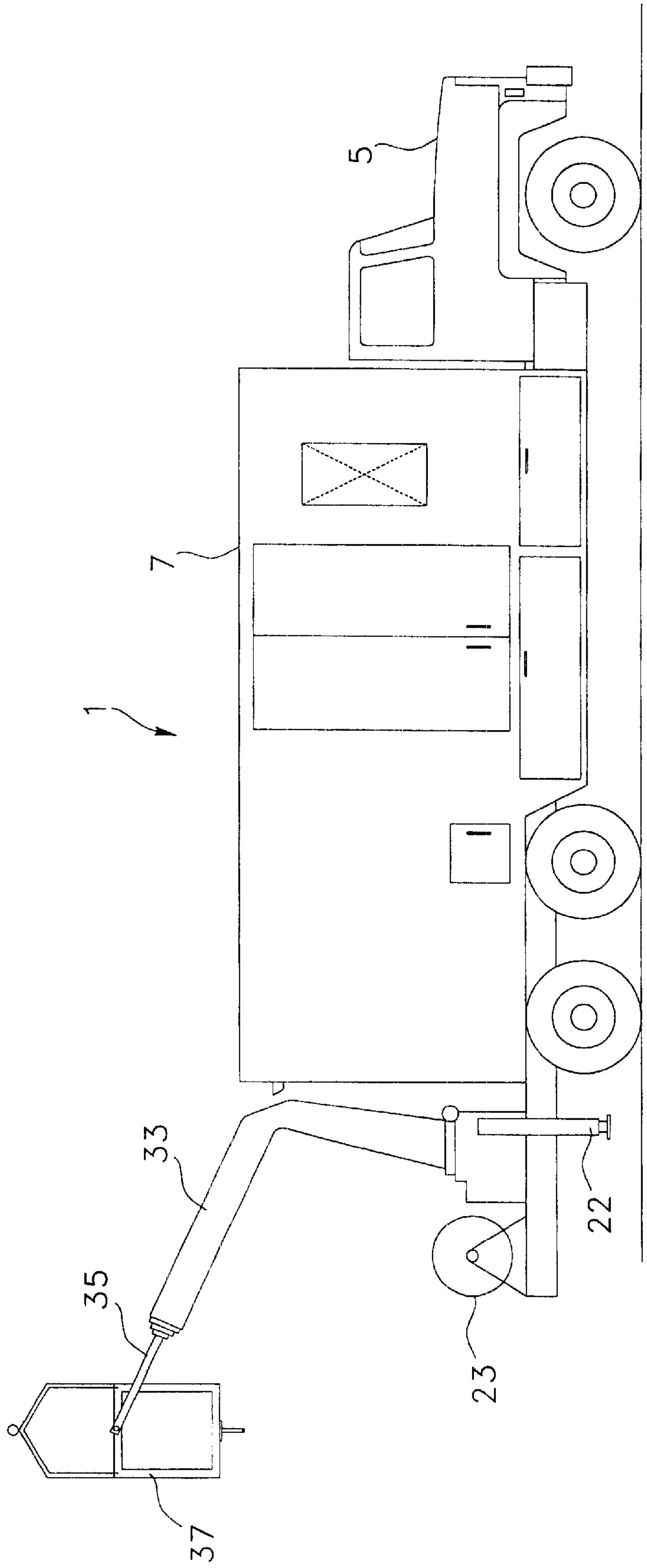
FIGS. 6 and 7 are side views of a washing and recycling vehicle according to the present invention, with its crane in extended and retracted positions respectively.
Figure 7:
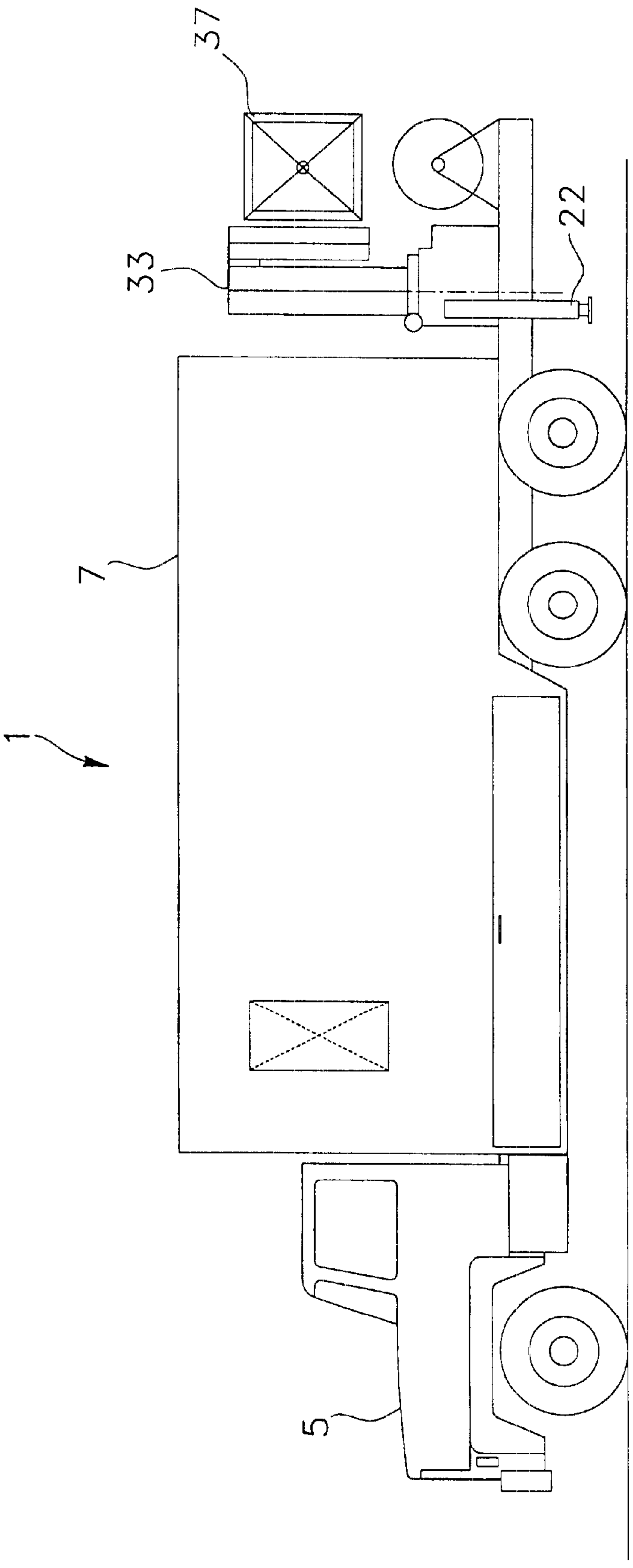

Referring to FIGS. 6 and 7 there is shown the washing and recycling unit 1 mounted the truck 5 with its crane 33 in extended and retracted positions respectively.

Figure 3:
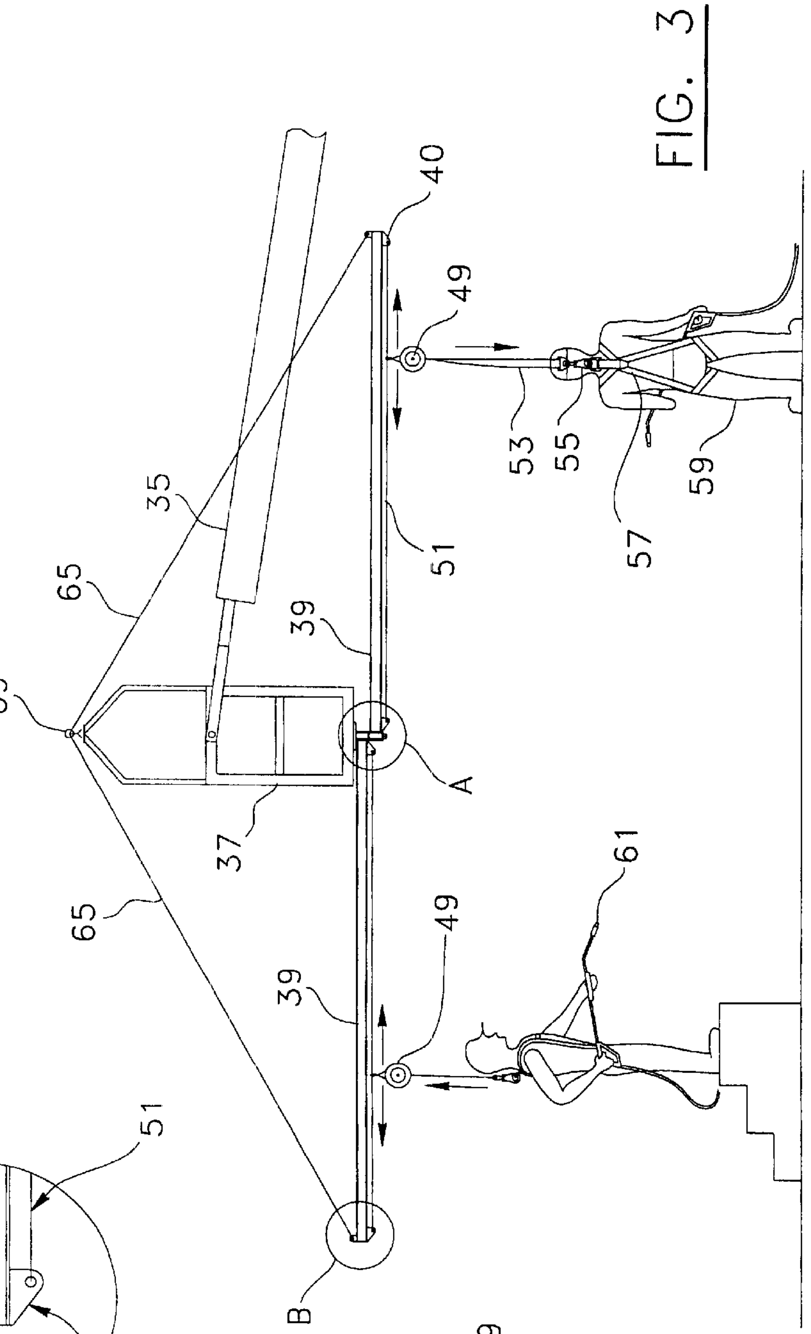
FIG. 3 is side view of the pivoting rails and harnesses supporting the operators shown in FIG. 1.
Figure 5:
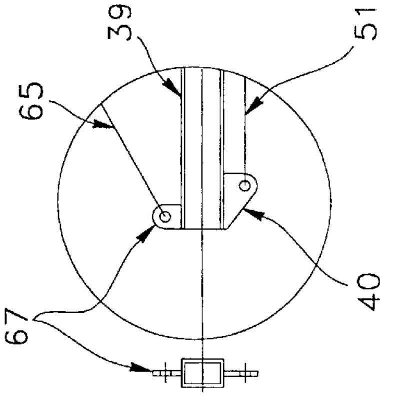
FIG. 5 is an enlarged view of a circled portion B shown in FIG. 3.
Figure 4:
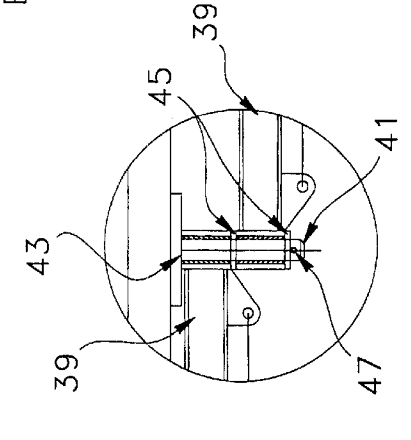
FIG. 4 is an enlarged view of circled portion A shown in FIG. 3.

Referring to FIGS. 3 to 5, the pivoting rails 39 are detachably connected to a pivot 41 having a cushion or shock absorber 43, spacers 45, and a holding pin 47. A safety belt reel 49 is slidably mounted on a cable 51, which is attached at each end 40 of a rail 39. A nylon belt 53 is wound inside the reel 49 at one end thereof and has another end attached to the back hook 55 of a harness 57 secured on an operator 59 holding a water hose pistol 61.

In use, the operator 59 can freely move along the radial axis defined by the pivoting rail 39. As shown in FIG. 2, the operator 59 can thus move anywhere inside a circle 63 defined by the length of the pivoting rail 39. Furthermore, the harness 57 and safety belt 53 allow the operator to slowly move up and down on top of machinery to be washed. However, if for any reason the operator falls, especially if the surface of the machinery is slippery, the safety belt blocks the operator's fall immediately just the same as a car safety belt would do.

In order to reinforce the strength of the pivoting rails 39 and pivot 41, a pair of cables 65 may be positioned between an end 67 of each pivoting rail 39 and the top 69 of the basket 37.

Figure 8:
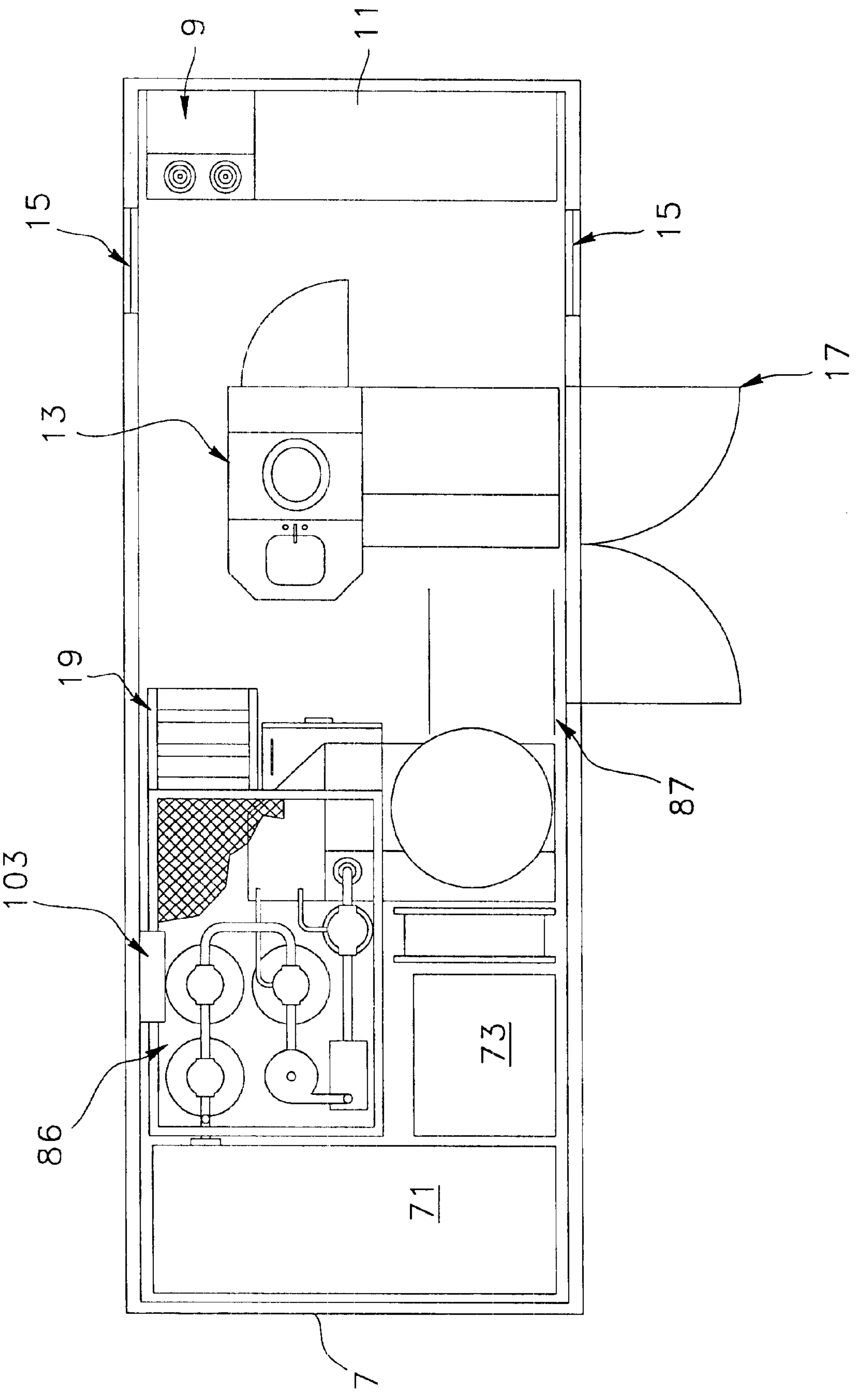
FIGS. 8, 9 and 10 are, respectively, top and opposite side section views of a vehicle provided with a washing and recycling unit according to the present invention.
Figure 9:
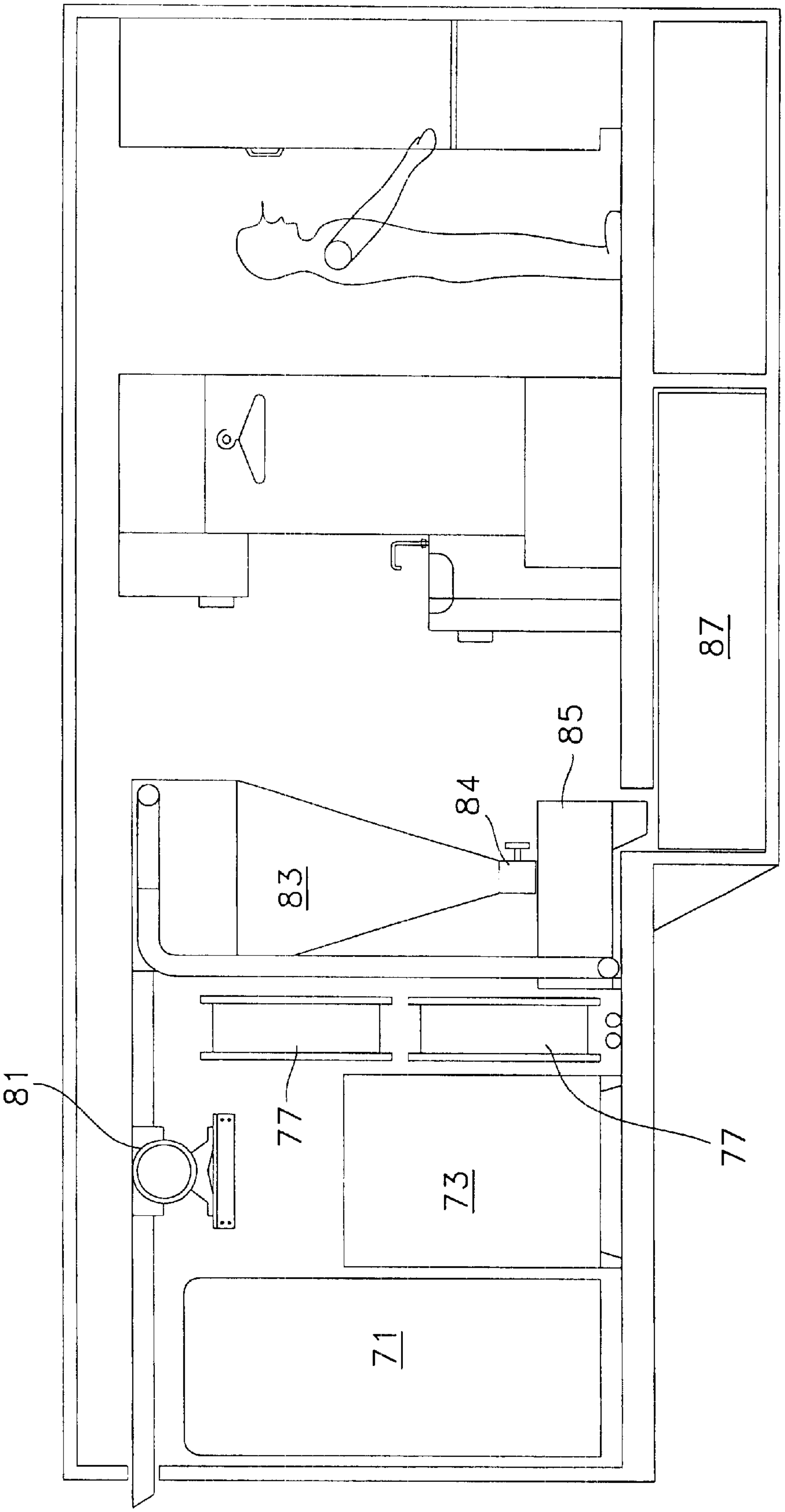
Figure 10:
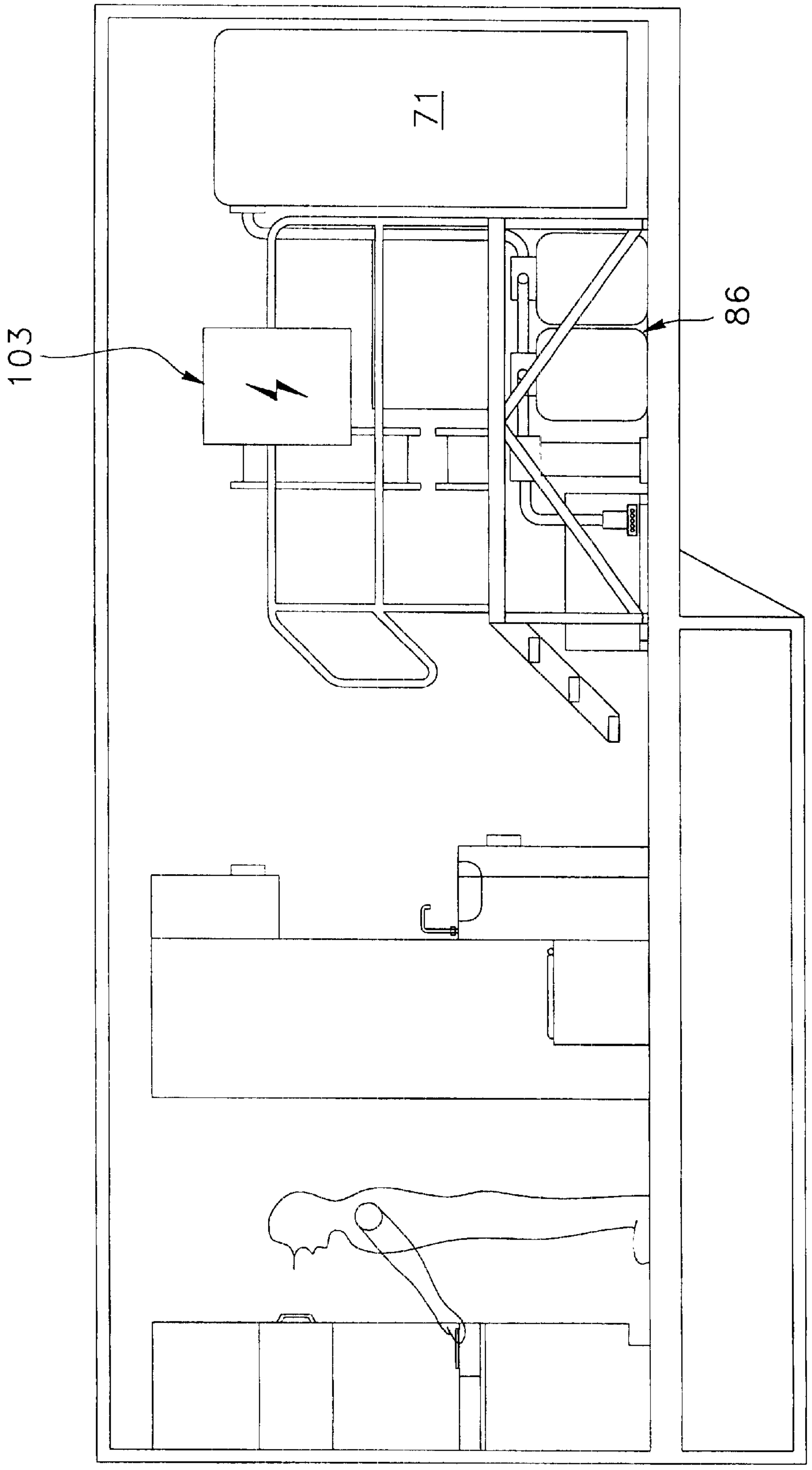

Referring to FIG. 8, there is shown the main washing components that are carried inside the container 7. For the comfort and autonomy of its users, the container 7 may be provided with such commodities as a stove 9, kitchen table 11, washroom 13, side windows 15, access doors 17, which are all generally disposed on one side of the container 7. An electric control panel 103 is also providing for controlling the main elements of the washing and recycling unit 1.

The main elements of the washing and recycling unit 1 are located on the other side of the container 7, which are easily accessible through stairs 19. The container 7 houses a washing liquid storage tank 71 for storage of washing liquid. The storage tank 71 is connected to a washer 73 which may be electric, hydraulic or fuel generated. The washer 73 has a pump for pumping the liquid out of the storage tank 71 and preferably a heater to heat the liquid in order to obtain a better wash.

Referring to FIG. 12, the washer 73 is connected to one or more hoses 75, each of which is wound on a supporting reel 77. The drainage receptacle 31 collects the used liquid mixture falling off the washed machinery. A suction hose 79 sucks up the used liquid mixture from the drainage receptacle 31. Drainage conduits (not shown) connecting each sections of the drainage receptacle 31 to the hose 79 can be used if desired. This suction hose 79 is connected to a vacuum pump 81 and cyclone 83. The cyclone 83 receives the used liquid mixture and separates rough solids from liquids contained in the used liquid mixture. A settling tank 85 is disposed under the cyclone 83 and a strainer 84 extends therebetween. The rough solids tend go to the bottom of the settling tank 85 and into a sewage tank 87, which can be periodically emptied. The settling tank 85 may be provided with movable vertical plates (not shown) for accelerating the settling of the solids at the bottom of the settling tank 85. These vertical plates may be operated manually by an operator or can function automatically. Surface oils may be also be removed by means of an absorbing material.

A pneumatic, a diaphragm or electrical pump can be used instead of the vacuum pump 81 but these are generally not strong enough for the present purposes and these also tend to clog up. Therefore, the use of a vacuum pump and a cyclone is more efficient than just using the settling tank 85 because of the advantageous use of the centrifugal forces in the cyclone 83.

Referring to FIGS. 8, 9, 10 and 13, a suction pump 89 is connected to the settling tank 85 for pumping the used liquid into a series of filters 86 that can be modified or removed depending on the particular tolerances required. The first of such filters is an ultrasonic micro strainer 91. A preferred ultrasonic micro strainer for use with the present invention is the USCMS 2619 (trade mark) ultrasonic micro strainer by Aquarius Services & Technologies Inc. of Saint-Laurent, Quebec, Canada. This strainer provides highly efficient solids-liquid separation of particles as small as 50 microns and self-cleaning through the action of mechanically generated ultra-sound. The ultrasonic strainer 91 may be connected to a drain 93 for performing backwash cleaning thereof. The ultra-sonic strainer 91 is connected to an overpressure pump 95, which in turn is connected to another cyclone 97 and to a nano-filtration module 99. The drain 93 is shown connected to both the ultrasonic micro strainer 91 and the nano-filtration module 99. The nano-filtration module 99 is provided with a membrane, which reduces the concentration of particles to less than 33 ppm. An odor filter 101 may be provided after the nano-filtration module 99. This filter 101 may provide an ozone treatment to the used water in order to destroy bacteria that can block the passages and create bad odors. The cleaned water then returns back to the washing liquid storage tank 71, completing the closed circuit recycling process. It also preferable to add some products during the filtration stage, to stabilize the pH for example, which are later removed by doing a backwash operation of the drain 93, as these added products do not return to the storage tank 71. In order to stabilize the pH to about 6.5, sodium carbonate may be added automatically. Many types of filters may be provided as well, such as sand filters, activated coal filters, or the like, depending on particular applications and desired water purity.

The washing and recycling unit 1 preferably requires three operators: two operators for washing the machinery with pressurized jets and a third operator supervising the operations and surveying the system. The washing of the machinery is preferably done on a road having a slight slope for facilitating the water flow, and near the forest site for forestry machinery. The drainage receptacle ground strips 27 are put on the ground and their side flanges may be inflated with an air compressor. The washing operation is mainly focused on the motor, the cabin, the hydraulic pump, the gearbox, the electric panel and connections, and the radiator of the forestry vehicle. The washing of these main parts of the forestry vehicle removes oil, grease, mud and other residues that can lead to a heat build up or fire in the forestry vehicle.

Actual washing of a forestry vehicle takes about 35 minutes including 20 minutes of continuous water flow at 45,5 liters per minute (10 gallons per minute). The total water consumption is thus about 908 liters for a regular vehicle and can be as much as 1800 liters for a bigger vehicle such as a tractor with a felling head. The washing of a forestry vehicle produces an average of 20 liters of solid contaminants in the sewage tank. The total water contained in the present system is about 6360 liters (1400 gallons) and the settling tank capacity is about 1360 liters.

Water losses amount to about 45 to 50 liters per washed machine. These losses are due to the water evaporation in the heater (2%), to losses due to water splashing outside of the drainage receptacle (1%), to losses due to water mixing with the contaminants and trapped in the machine (7%).

The washing of a machine using a traditional indoor garage takes height hours including 50 minutes of continuous water flow per hour. With a washer providing 22.7 liters per hour, this corresponds to a total consumption of 9080 liters. An average of 100 liters of solid contaminants are produced.

In contrast, if two washing and recycling units of the present invention are used instead during 2.5 hours of continuous water flow with a water reserve of 6800 liters, there will be only losses of about 341 liters (5%) for the same reasons as above compared to the 9080 liters of the traditional garage system.

The washing and recycling unit of the present invention has the advantage of eliminating contaminants in recycled water well below 33 ppm. Furthermore, the hoisting system of the washing and recycling unit allows the operators to wash the vehicles more thoroughly and safely.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A washing and recycling unit for on-site washing of heavy machinery, comprising:

a supporting frame;

a washing liquid storage tank mounted onto the supporting frame for storage of washing liquid;

a washing hose arrangement connected to the tank, for injecting the washing liquid over the heavy machinery;

a drainage receptacle adapted to extend under the heavy machinery, for collecting used liquid mixture falling from the heavy machinery derived from the washing liquid being injected thereover;

a suction hose arrangement for sucking up the used liquid mixture from the drainage receptacle;

a cyclone mounted onto the supporting frame and connected to the suction hose arrangement for receiving the used liquid mixture and separating rough solids from liquids contained in the used liquid mixture;

a settling tank mounted onto the supporting frame and under the cyclone;

a pump and filtering arrangement mounted onto the supporting frame and extending between the settling tank and the washing liquid storage tank for pumping out and filtering liquid from the settling tank and transferring the liquid into the washing liquid storage tank; and a hoisting means mounted onto the supporting frame, for movably supporting an operator directing the washing liquid around the heavy machinery.

2. The washing and recycling unit according to claim 1, wherein the washing hose arrangement comprises a heater for heating the washing liquid prior to injection over the heavy machinery.

3. The washing and recycling unit according to claim 1, wherein the washing hose arrangement comprises a reel mounted onto the supporting frame, and a hose wound around the reel.

4. The washing and recycling unit according to claim 3, wherein the washing hose arrangement comprises an additional reel mounted onto the supporting frame and an additional hose mounted onto additional reel.

5. The washing and recycling unit according to claim 1, wherein the drainage receptacle comprises:

impermeable ground strips with peripheral liquid retaining flanges for installation on sides and beneath the heavy machinery; and cover strips for installation over wheels of the heavy machinery to deflect the used liquid mixture over the ground strips.

6. The washing and recycling unit according to claim 5, wherein the ground and cover strips are made of a flexible and resilient material.

7. The washing and recycling unit according to claim 1, wherein the suction hose arrangement comprises a hose connected to the cyclone.

8. The washing and recycling unit according to claim 1, wherein the cyclone is provided with a vacuum pump producing suction in the suction hose, and a strainer extending between the cyclone and the settling tank.

9. The washing and recycling unit according to claim 1, further comprising a sewage tank mounted onto the supporting frame and connected to the settling tank, for storing sewage from the settling tank.

10. The washing and recycling unit according to claim 1, wherein the pump and filtering arrangement comprises an ultrasonic micro strainer connected to a over-pressure pump connected to a nano-filtration module connected to an odor filter.

11. The washing and recycling unit according to claim 10, wherein the pump and filtering arrangement further comprises a drain connected to the ultrasound filter and the nano-filtration module.

12. The washing and recycling unit according to claim 1, wherein the hoisting means comprises a crane having a base attached onto the supporting frame, and a movable boom.

13. The washing and recycling unit according to claim 12, wherein the hoisting means further comprises a basket attached at an end of the boom for carrying the operator.

14. The washing and recycling unit according to claim 12, wherein the hoisting means further comprises an elongated rail pivotally attached at an end of the boom, and a safety harness movably hanged to the rail for following the operator around the heavy machinery.

15. The washing and recycling unit according to claim 14, wherein the harness is provided with a reel sliding under the rail and a belt adjustably wound around the reel.

16. The washing and recycling unit according to claim 1, wherein the supporting frame forms a structural part of a mobile unit.

17. The washing and recycling unit according to claim 16, herein the mobile unit is a truck.

18. The washing and recycling unit according to claim 1, further comprising a control panel mounted onto the supporting frame for controllably operating the washing hose arrangement, the cyclone, the pump and filtering arrangement and the hoist.

* * * * *

UNITED STATES PATENT AND TRADEMARK OFFICE
CERTIFICATE OF CORRECTION

PATENT NO. : 6,481,448 B2
DATED : November 19, 2002
INVENTOR(S) : Christian Mathieu It is certified that error appears in the above-identified patent and that said Letters Patent is hereby corrected as shown below:

Title page,
Please add:

-- [30] Foreign Application Priority Data
July 5, 2000 (CA) ...................... 2,314,542 --

Signed and Sealed this

Twenty-fourth Day of June, 2003

JAMES E. ROGAN
*Director of the United States Patent and Trademark Office*